(12) United States Patent
Vu et al.

(10) Patent No.: US 11,573,195 B2
(45) Date of Patent: *Feb. 7, 2023

(54) SOLID STATE PH SENSING CONTINUOUS FLOW SYSTEM

(71) Applicant: Parker-Hannifin Corporation, Cleveland, OH (US)

(72) Inventors: Thang Huy Vu, San Jose, CA (US); Steve Roth, San Jose, CA (US); Srinivas Rao, Sunnyvale, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/444,014

(22) Filed: Jul. 29, 2021

(65) Prior Publication Data

US 2021/0356418 A1 Nov. 18, 2021

Related U.S. Application Data

(63) Continuation of application No. 15/469,234, filed on Mar. 24, 2017, now Pat. No. 11,079,350.

(60) Provisional application No. 62/313,607, filed on Mar. 25, 2016.

(51) Int. Cl.
*G01N 27/30* (2006.01)

(52) U.S. Cl.
CPC .................. *G01N 27/302* (2013.01)

(58) Field of Classification Search
CPC ..... G01N 27/302; G01N 27/222; G01N 27/36
See application file for complete search history.

(56) References Cited

U.S. PATENT DOCUMENTS

| 3,916,300 | A | 10/1975 | Chisdes |
| 4,172,770 | A | 10/1979 | Semersky |
| 4,627,893 | A | 12/1986 | Cormier |
| 8,658,094 | B2 | 2/2014 | Hicks |
| 2004/0060576 | A1 | 4/2004 | Cronin |
| 2005/0258839 | A1 | 11/2005 | Gaignet |
| 2007/0272552 | A1 | 11/2007 | Jiang |
| 2009/0178921 | A1 | 7/2009 | Lawrence |
| 2011/0048969 | A1 | 3/2011 | Lawrence |
| 2012/0132544 | A1 | 5/2012 | Lawrence |
| 2012/0187000 | A1 | 7/2012 | Kahn |
| 2012/0279874 | A1* | 11/2012 | Lawrence ............ G01N 27/302 204/406 |
| 2013/0168609 | A1 | 7/2013 | Lee |
| 2013/0248364 | A1 | 9/2013 | Kahn |
| 2014/0004002 | A1* | 1/2014 | Platte ..................... G01N 27/04 422/82.02 |
| 2014/0042026 | A1 | 2/2014 | Kahn |
| 2014/0158536 | A1 | 6/2014 | Thompson |
| 2014/0332398 | A1 | 11/2014 | Lawrence |
| 2014/0332411 | A1 | 11/2014 | Lawrence |
| 2014/0367277 | A1 | 12/2014 | Crawford |
| 2017/0203974 | A1 | 7/2017 | Riedl |

FOREIGN PATENT DOCUMENTS

| WO | 2013112767 | 8/2013 |
| WO | 2014106066 | 7/2014 |

* cited by examiner

*Primary Examiner* — Joshua L Allen
(74) *Attorney, Agent, or Firm* — David R. Conklin; Kirton McConkie

(57) ABSTRACT

The present invention relates generally to systems for measuring pH. In particular, the present invention relates to a continuous flow system having one or more solid state pH sensors positioned within a fluid pathway of the system to provide continuous pH measurement.

19 Claims, 13 Drawing Sheets

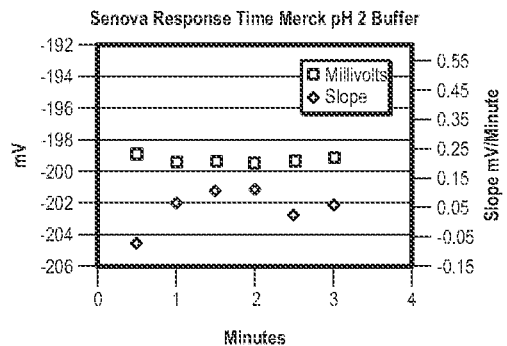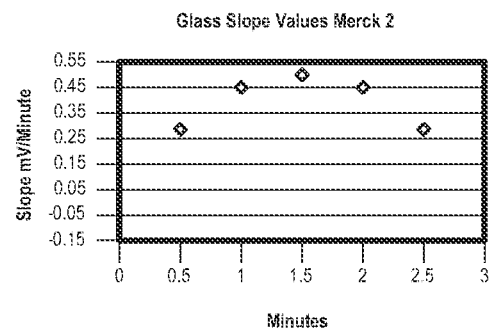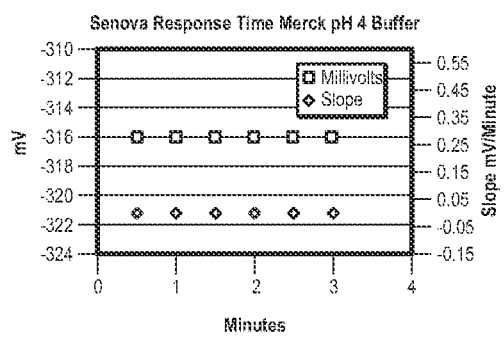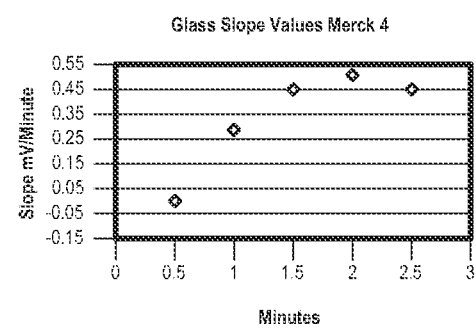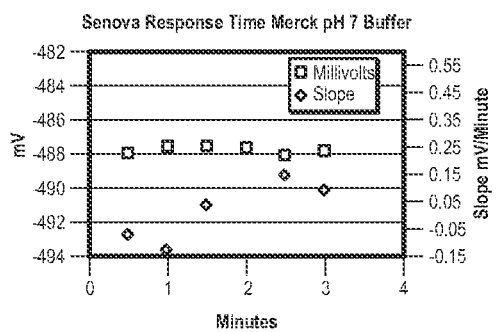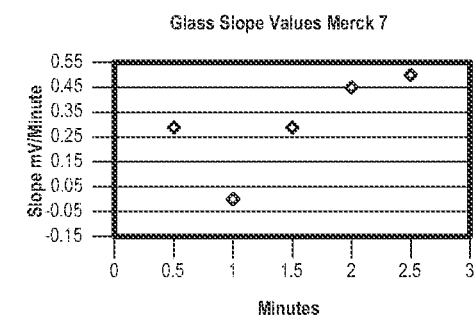
FIG. 20

SOLID STATE PH SENSING CONTINUOUS FLOW SYSTEM

RELATED APPLICATIONS

This application is a continuation of U.S. patent application Ser. No. 15/469,234, entitled SOLID STATE pH SENSING CONTINUOUS FLOW SYSTEM, now issued as U.S. Pat. No. 11,079,350, which claims priority to U.S. Provisional Patent Application Ser. No. 62/313,607, entitled SOLID STATE pH SENSING CONTINUOUS FLOW SYSTEM, filed on Mar. 25, 2016, each of which is incorporated herein by reference in its entirety.

BACKGROUND OF THE INVENTION

Field of the Invention

The present invention relates generally to systems for measuring pH. In particular, the present invention relates to a continuous flow system having one or more solid state pH sensors positioned within a fluid pathway of the system to provide continuous pH measurement.

Background

Most conventional pH sensors on the market today utilize an ion sensitive glass bulb sensitive to pH and an internal reference electrode. These conventional pH probes require constant recalibration, the electrodes must be stored in a KCl solution to keep the porous frit from drying out, and the fragile glass membrane renders these probes unsuitable for many applications where pH measurement is required under conditions of high temperature or pressure. The performance of these pH sensors decrease over time as the glass membrane may become less sensitive to ions in a solution.

Effort has been made to improve the function of the reference electrode by, for instance, modification of the electrode-analyte interface (see U.S. Pat. No. 7,276,142) or replacement of the typically heterogeneous redox couple (e.g. calomel or silver/silver chloride) with a homogeneous redox couple (e.g. iodide/triiodide) (see U.S. Pat. No. 4,495,050). These changes are based on the extension of the potentiometric reference electrode concept wherein the conventional reference electrode (CRE) typically comprises two halves of a redox couple in contact with an electrolyte of fixed ionic composition and ionic strength. Because both halves of the redox couple are present and the composition of all the species involved is fixed, the system is maintained at equilibrium and the potential drop (i.e. the measured voltage) across the electrode-electrolyte interface of the conventional reference electrode is then thermodynamically fixed and constant. The function of the reference electrode is then to provide a fixed potential to which other measurements, such as pH, may be compared.

While these conventional reference electrodes provide a stable potential, they suffer from many disadvantages. One disadvantage is the need for an electrolyte of fixed and known ionic composition and ionic strength, because any change in ionic composition or strength will result in a shift in equilibrium of the redox couple, thereby compromising the stability of the constant potential of the electrode. To preclude a change in electrolyte composition, the redox system and electrolyte are typically isolated from the sample under study via a porous frit or small aperture. This isolation introduces an additional disadvantage to the conventional reference electrode, namely the propensity for the frit or aperture to clog, rendering the electrode useless. These disadvantages are exacerbated by the fact that the electrolyte is typically an aqueous solution of high salt concentration, resulting in the requirement that the electrode frit or aperture must be kept wet to avoid clogging due to salt precipitation.

For glass pH probes, a measuring circuit using a solution ground or other means to boost reference input impedance may be required to improve stability of the reference electrode in analyte solutions having certain conductivity properties. Otherwise, replacing or rejuvenating the reference electrode at more frequent intervals may be necessary. Following good sampling practices and using quality instrumentation is normally required to reduce the flow dependence of these measurements to negligible levels. This enables closer control of cycle chemistry with resultant increases in efficiency by reducing corrosion rates and corrosion product deposition in the system.

Glass bulb pH probes are further inefficient and unreliable at measuring pH in continuous flow conditions. As used herein, "continuous flow conditions" is understood to describe the uninterrupted flow of a fluid for which measurement of the fluid's pH is desired. The flow rate at which the fluid bypasses the glass bulb pH probe determines how long the analyte is actually in contact with the probe electrodes. In case of glass pH probe, controlling the flow is an important variable in probe performance (process time and response time). Further, there are at least three challenges to consider when measuring pH under continuous flow conditions, namely, ionization, sampling and sensor effects.

Ionization/Dissociation

Flow itself does not cause change in ionic concentration. Under moderate conditions, an analyte under flow experiences no effect on ionization. In other words, there is no inherent flow dependence for ionization. However, there can be secondary factors which effect ionization of an analyte under flow. For example, in some instances flow may affect sample temperature which in turn influences ionization. Thus, pH sampling under these conditions must account for ionization.

Sampling

Continuous flow systems may include numerous fittings, crevices, reaction products and deposits which may affect flow rate, and thereby have a significant effect on the adsorption and desorption of ions within the system. This is especially true in continuous flow systems having contaminated sample lines. Thus, the actual ionic content of a sample fluid may be affected. This type of phenomenon is commonly observed in capillary tubing of ion chromatographs, where various ion adsorbing and desorbing is seen along the length of the tubing. The resulting effect on pH measurement is increased and variable response times, as compared to stagnant conditions. Flow rates further affect ion transport, which further contributes to unreliable pH measurement response times, especially when combined with the porous structure of glass bulb pH probes.

Sensor Effects

Glass pH probe sensors are susceptible to flow dependence from two basic sources, namely streaming potentials and reference junction potentials, which occurs between probe's pH measuring and reference electrodes. Thus, pH measurement with glass probe sensors provide unreliable measurement under continuous flow conditions due to flow dependent interference based on the millivolt signal between these electrodes.

While pH is unaffected by flowrate, the measurement of pH with glass probe can be greatly affected by flowrate.

Fluid mechanics, system layout, and glass probe placement may further affect measurement of pH.

Further still, fluid pressure may affect pH measurement since it directly affects the reference junction of a glass pH probe, which may force trace amounts of process material into the junction. At very low or very high pH (<4 or >10 pH) this will have greater effect on pH measurement and could be on the order of ±0.2 pH for large pressure changes glass pH probes further have challenges with cycling high pressures and flowrates which cause slight compression and expansion of electrolyte contents, thereby causing electrolyte dilution or contamination in the junction, which shortens the life of a pH sensor. High flow rates or cycling high pressures may further lead to structural failure of the fragile glass material of traditional pH probes.

Accordingly, while systems and methods currently exist for measuring pH under continuous flow conditions, challenges still exist. The systems and methods of the present invention overcome these challenges.

SUMMARY OF THE INVENTION

The Present invention relates generally to systems and methods for measuring pH under continuous flow conditions. Specifically, some embodiments of the present invention provide a continuous flow system having one or more housings for compatibly receiving and positioning a solid state pH sensor in the fluid pathway of the continuous flow system, thereby assuring that measurement accuracy is not compromised by variance in flow rate. In some instances, the continuous flow system comprises a plurality of fluid sources at one or more flow rates, wherein the fluid sources might react with one another to affect a change in pH.

In some embodiments, the present invention comprises a solid state pH sensor having an analyte sensitive material (ASM) covalently bound to a polymer backbone, wherein the ASM comprises at least one of a quinone, dihydroxy anthraquinone, or an anthraquinone derivative, as disclosed in PCT/US2011/045385, which is incorporated herein in its entirety.

In some embodiments, the present invention further comprises a solid state pH sensor having a reference electrode comprising an analyte insensitive material (AIM) comprising at least one of ferrocene or a ferrocene derivative copolymerized in an acrylamide or bis-acrylamide network, as disclosed in PCT/US2015/035428, which is incorporated herein in its entirety.

In some embodiments, the present invention comprises a solid state pH meter device having four electrodes, and which is capable of accurately measuring pH in a continuous flow environment.

In some instances, the present invention comprises one or more housings, each housing having a port comprising a solid state pH sensor, wherein the pH sensor comprises one or more redox active materials.

In some instances, the continuous flow system of the present invention further includes a pseudo-reference electrode (PRE) comprising a sintered silver-silver chloride wire electrode which is used in combination with a redox active reference electrode comprising an AIM and a working electrode (WE).

In some instances, the continuous flow system of the present further comprises one or more solid state pH probes comprising an ASM covalently coupled to a polymer matrix, wherein the polymer matrix comprises at least one of a poly(vinyl alcohol) (PVA) or acrylamide matrix material, or an interpenetrating polymer network (IPN) comprising two or more polymers, as disclosed in PCT/US2011/45385.

In some instances, the continuous flow system of the present invention further comprises one or more solid state pH probes comprising at least one of an AIM and an ASM polymerized in an acrylamide network, as disclosed in PCT/US2015/035428.

BRIEF DESCRIPTION OF THE FIGURES

FIG. 20 shows various graphs comparing response times between solid state pH sensors and traditional glass bulb pH sensors in a continuous flow system in accordance to a representative embodiment of the present invention.

DETAILED DESCRIPTION OF THE INVENTION

The present invention relates generally to systems for measuring pH. In particular, the present invention relates to a continuous flow system having one or more solid state pH sensors positioned within a fluid pathway of the system to provide continuous pH measurement.

Figure 1:
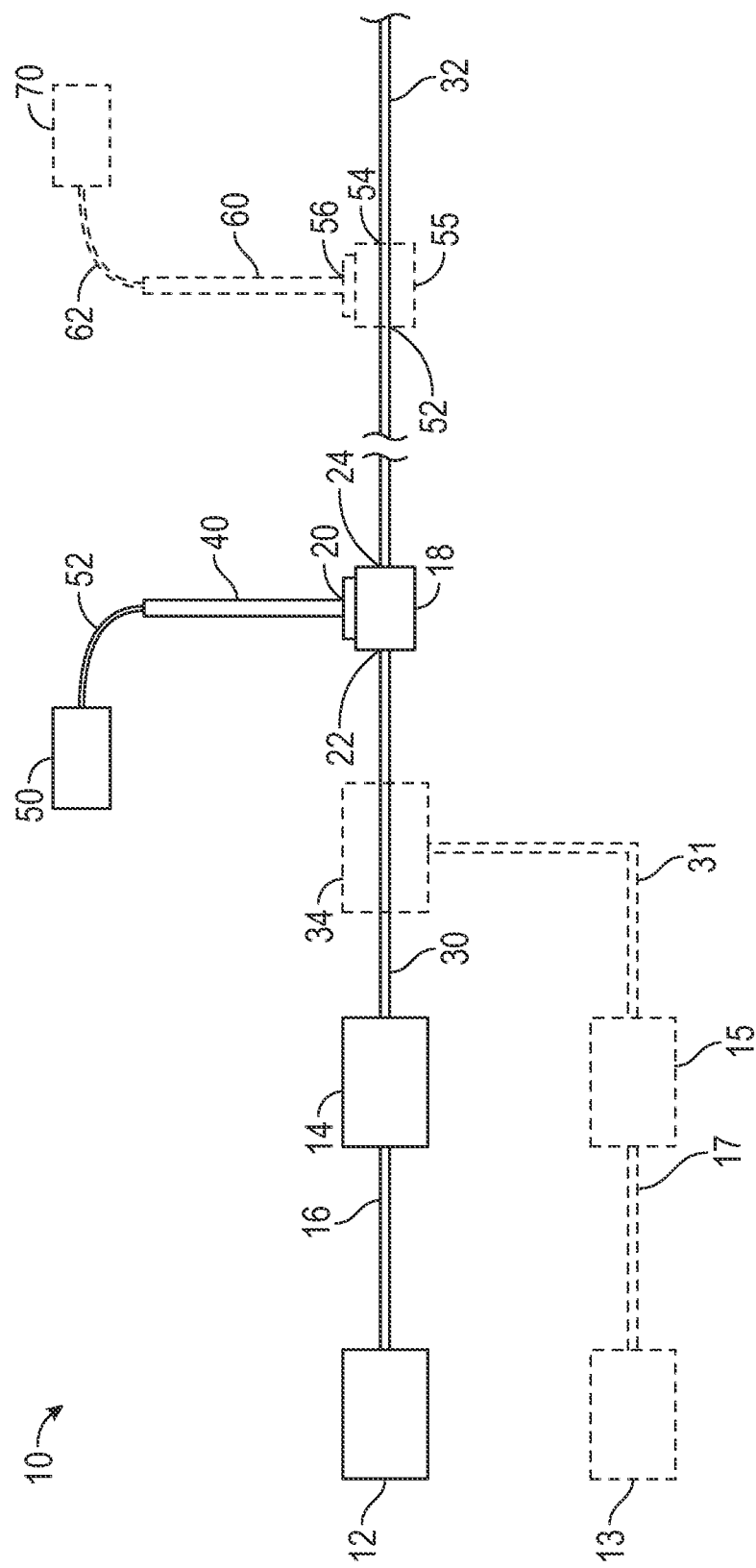
FIG. 1 shows a schematic view of a continuous flow system in accordance with a representative embodiment of the present invention.

Referring now to FIG. 1, a continuous flow system 10 is shown. In some embodiments, system 10 comprises a fluid source 12, such as a biological or life science fluidic sample. In some instances, fluid source 12 comprises a storage container. In some instances, fluid source 12 comprises a reaction chamber. Further still, in some embodiments fluid source 12 comprises an upstream manufacturing process, such as the production of a fluid product for which pH measurement and/or monitoring is desirable. In one embodiment, fluid source 12 comprises an upstream manufacturing process for a foodstuff. In one embodiment, fluid source 12 comprises an upstream manufacturing process for a chemical reagent. In one embodiment, fluid source 12 comprises a manufacturing process for a biological material.

In some embodiments, continuous flow system 10 further comprises a primary fluid pump 14 whereby to draw fluid from fluid source 12 through fluid line 16. Fluid pump 14 may comprise any type of suitable pump. For example, in some embodiments fluid pump 14 comprises a positive-displacement pump, such as a bulk-handling or metering pump. In other embodiments, fluid pump 14 is positioned upstream from fluid source 12 and comprises a nonpositive-displacement pump, such as a centrifugal pump.

Continuous flow system 10 further comprises a pH sensor housing 18. In some embodiments, housing 18 comprises an inlet port 22 for receiving an upstream fluid line 30 and an outlet port for receiving a downstream fluid line 32. Housing 18 further comprises a probe port 20 configured to selectively receive pH probe 40 in a fluid tight manner. pH probe 40 is further operably connected to a computer processor 50 via a data link 52.

pH probe 40 comprises a plurality of solid state pH sensors which provide stable pH measurement under various flow rates and conditions. As used herein, the term "pH sensor" is used to refer to a functional grouping of electrodes sufficient to generate a signal that can be processed to generate a reading indicative of the concentration of an analyte of interest in a solution. These electrodes may include a "working electrode", a "reference electrode", a "pseudo reference electrode" or a "counter electrode", as is commonly understood in the art. In some instances, pH probe 40 comprises a single surface that is exposed to the fluid source, wherein the single surface comprises a plurality of pH sensor electrodes.

In some embodiments, pH probe 40 comprises a solid state sensor having a redox active material immobilized on a conductive substrate, as discussed in PCT/US2015/035428 and PCT/US11/45385. In some embodiments, pH probe 40 further comprises a handheld assembly, as discussed in PCT/US2013/029746, which is incorporated herein in its entirety.

In some embodiments, pH sensor housing 18 comprises an internal pH sensor, wherein probe port 20 is absent or otherwise stopped, and an internal pH sensor is enclosed within pH sensor housing and positioned within a fluid pathway through pH sensor housing 18. In some instances, probe port 20 is stopped with a plug comprising a pH sensor.

In some embodiments, continuous flow system 10 further comprises a second fluid source 13 that is coupled to upstream fluid line 30 via secondary upstream and secondary downstream fluid lines 17 and 31, respectively. In some instances, system 10 further comprises a secondary fluid pump 15. For configurations comprising both first and second fluid sources 12 and 13, system 10 may further comprise an in-line static mixer 34 positioned downstream of location at which the flow from first and second fluid sources 12 and 13 converge.

In some embodiments, primary fluid pump 12 and secondary fluid pump 13 pump their respective fluids at equal flow rates. In some embodiments, primary fluid pump 12 pumps first fluid source 12 at a first flow rate, and secondary fluid pump 13 pumps second fluid source 13 at a second flow rate, wherein the first flow rate is greater than the second flow rate.

Continuous flow system 10 may further comprise a second pH sensor housing 55. In some instances, second pH sensor housing 55 is positioned downstream from pH sensor housing 18. In other instances, second pH sensor housing 55 is positioned upstream from pH sensor housing 18. Further, in some instances continuous flow system 10 comprises more than two pH sensor housings (not shown). Second pH sensor housing 55 further comprises an inlet port 52, and outlet port 54, and a probe port 56, wherein probe port 56 is configured to receive a second pH probe 60.

In some instances, pH sensor housing 18 is spaced from second pH sensor housing 55 by a distance predetermined to detect a change in pH of a fluid source. In some instances, a manufacturing process or treatment is interposed between pH sensor housing 18 and second pH sensor housing 55. For example, in some instances secondary downstream fluid line 31 converges with downstream fluid line 30 at a point downstream from pH sensor housing 18. Thus, second pH sensor housing 55 is positioned to measure the pH of the combined fluid sources 12 and 13.

The solid state components of the present invention can be stored dry or wet and require no maintenance or calibration. The solid state reference electrode comprises a solid material that is not subject to changes in potential based on diffusion. Further, the analyte insensitive material (AIM) adjusts for changes in potential of the solid reference electrode, thereby eliminating the need for calibration. Because all components of the pH sensor are solid, contamination of process flow by leaching is reduced. Further, in-line pH sensors can be sterilized by autoclave or Gamma treatment for processes requiring sterile environments.

Figure 2A:
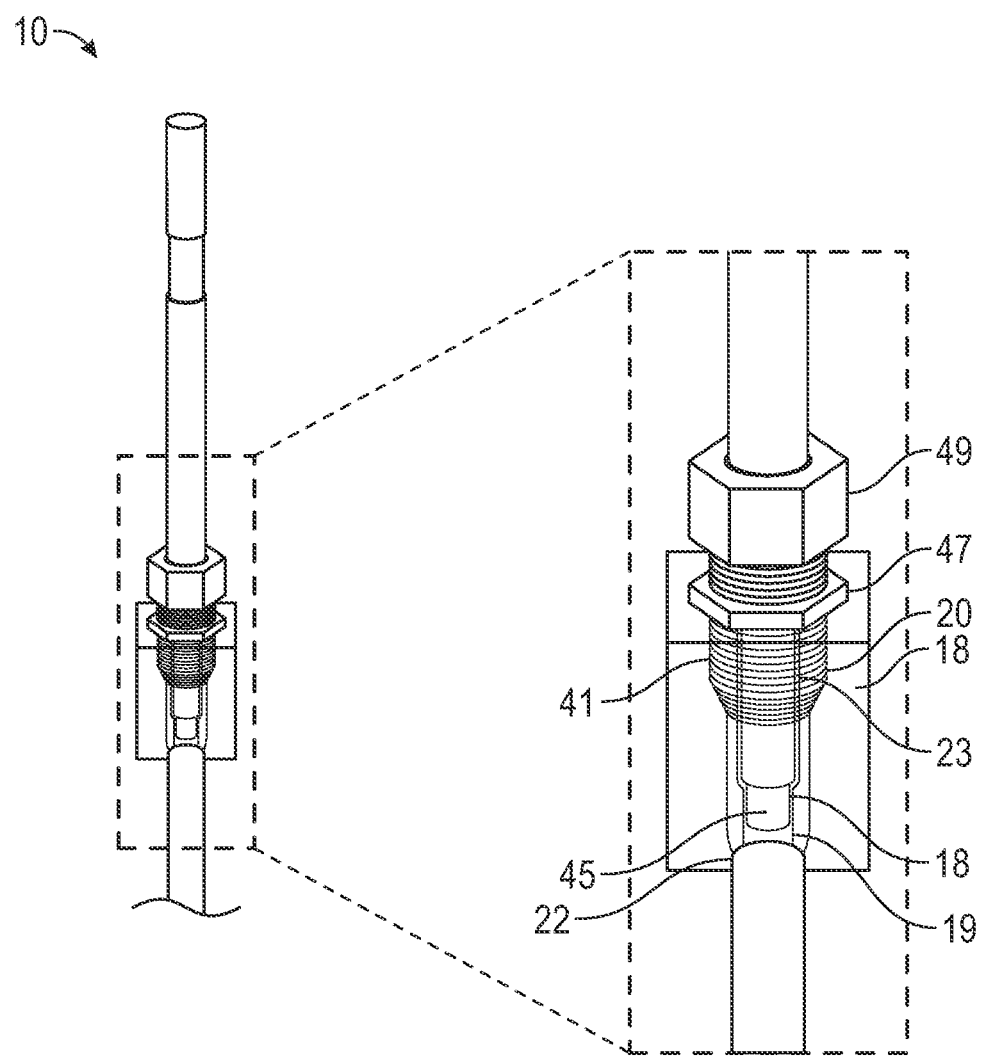
FIG. 2A shows a detailed view of a pH sensor housing of a continuous flow system in accordance with a representative embodiment of the present invention.
Figure 2B:
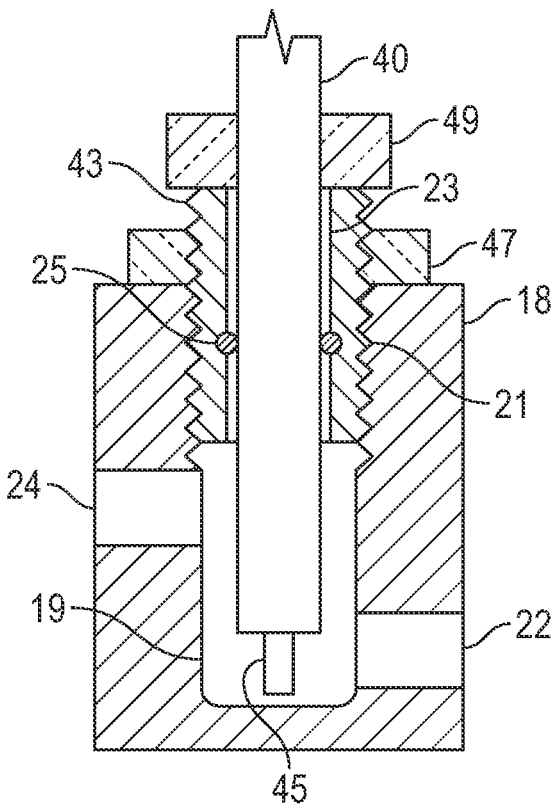
FIG. 2B shows a cross-section side view of a pH sensor housing of a continuous flow system in accordance with a representative embodiment of the present invention.
Figure 3:
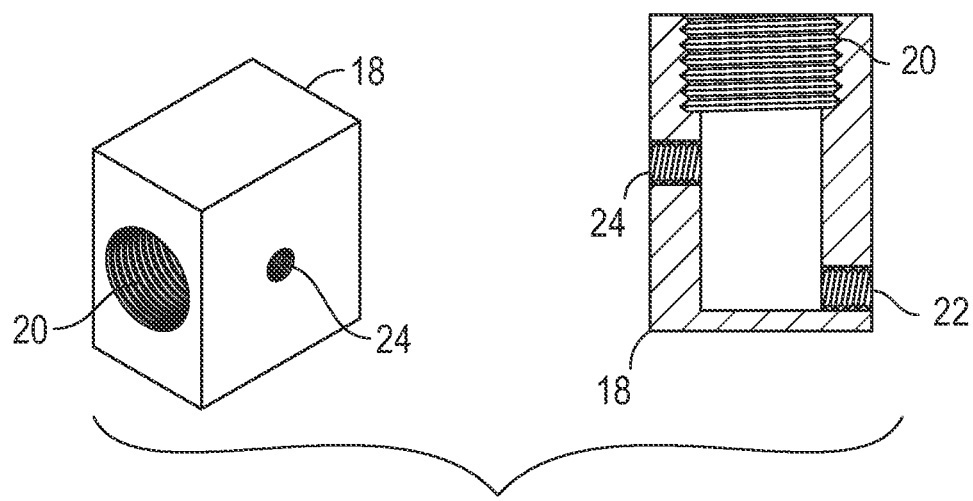
FIG. 3 shows engineered drawings of the pH sensor housing of FIG. 2, in accordance with a representative embodiment of the present invention.

Referring now to FIGS. 2A, 2B and 3, a solid state pH meter 40 is shown inserted within pH sensor housing 18 of the instant invention. In some embodiments, pH sensor housing 18 comprises a probe port 20 having a set of threads 21 configured to receive a matching set of threads 41 on an outer surface of a probe adapter 43. Probe adapter 43 generally comprises an elongated body having a central opening 23 configured to selectively receive pH probe 40. In some instances, central opening 23 further comprises one or more sealing members 25, such as an O-ring, which forms a fluid tight seal between central opening 23 and the outer surface of pH probe 40. Sealing member 25 thus prevents passage of fluids through central opening 23. In some instances, sealing member 25 is positioned such that sealing member 25 is compressed as probe adapter 43 is threaded into probe port 20. Thus, the compressive force between sealing member 25 and the outer surface of pH probe 40 is increased as probe adapter 43 is threadedly inserted into probe port 20. In some embodiments, probe adapter 43 further comprises a locking nut 47 that is tightened against the top surface of pH sensor housing to prevent premature disengagement of the adapter from the port. In some instances, probe adapter 43 further comprises a cap 49 having an outer surface to enable threaded insertion of the adapter into probe port 20. In some embodiments, sealing member 25 is interposedly positioned between the outer surface of pH probe 40 and an inner surface of cap 49. In some instances, a tip portion of pH probe 40 is threaded so as to be directly coupled to the threads of probe port 20, in a fluid tight manner, without requiring probe adapter 43 (not shown).

Tip 45 of pH probe 40 further comprises a pH sensor that extends distally from the body of the pH probe and is positioned within fluid pathway 19 of pH sensor housing 18 when pH probe 40 is coupled thereto. pH sensor housing 18 comprises an inner diameter selected to accommodate placement of pH sensor tip 45 without occluding or otherwise blocking fluid pathway 19.

In some embodiments, the inlet port 22 and outlet port 24 of pH sensor housing 18 are offset, such that fluid enters towards the bottom of the housing and exits towards the top of the housing. This method of flow prevents entrapment of air bubbles that may otherwise be retained against pH sensor 45 as a result of aberrant flows caused by top filling housing 18. This method of flow further maintains constant contact between the fluid and pH sensor 45, regardless of flow rate disturbance or fluctuation. In some instances, the fluid pathway through probe port 20 is devoid of right angles, thereby preventing aberrant flows or stagnation which may cause localized areas of increased ion concentrations.

Figure 4:
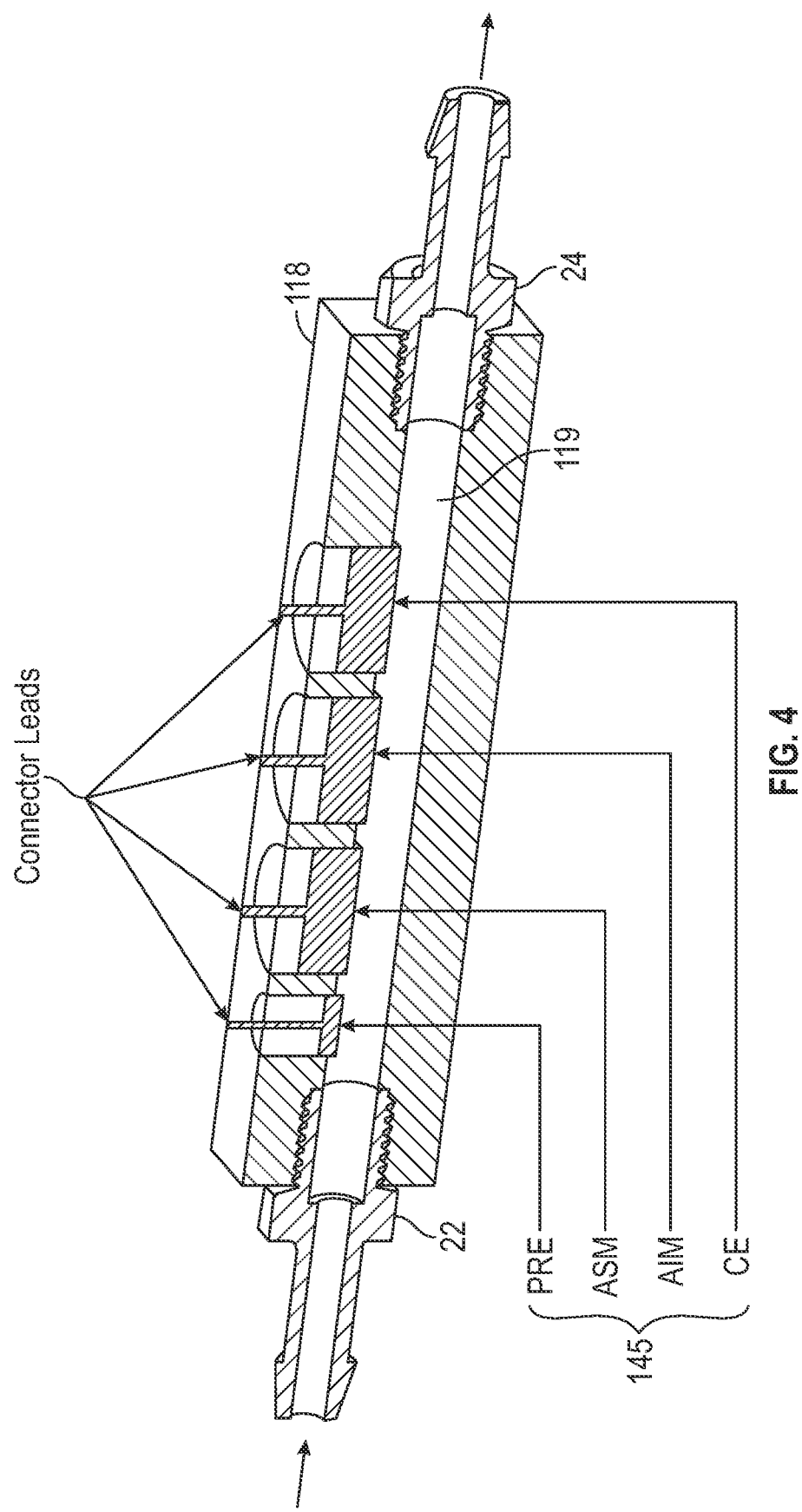
FIG. 4 is a cross-section side view of a pH sensor housing in accordance with a representative embodiment of the present invention.

Referring now to FIG. 4, in one embodiment pH sensor housing 118 comprises an elongated body having a plurality of individual pH sensors 145 positioned along the length of housing 118. Each pH sensor is spaced apart from an adjacent pH sensor. An active surface of each sensor is positioned within the fluid pathway 119 in order to make contact with a fluid source moving there through. In some instances, the exposed surface area of one or more of the plurality of sensors 145 is increased by moving the sensor further into the fluid pathway 119. In some instances, the plurality of sensors 145 are positioned flush with the inner wall surface of pH sensor housing 118. In some instances, the plurality of sensors 145 are recessed within the inner wall surface of pH sensor housing 118. Plurality of sensors 145 further comprise connector leads 152 that are collectively or individually connected to one or more computer processors 50.

In some embodiments, each sensor comprises a unique function that is used in combination with one or more of the remaining sensors to collectively detect an analyte in the fluid source. In some embodiments, pH sensor housing 118 comprises two or more replicate sensors. Further, in some instances a continuous flow system 10 comprises a plurality of pH sensor housings 118, wherein two or more of the housings comprise an identical set of pH sensors. In other embodiments, a continuous flow system 10 comprises a plurality of pH sensor housings 118, wherein two or more of the housings comprise a unique set of pH sensors.

In some instances, a pH probe and continuous flow system of the present invention is designed in a "Made-to-fit-the-application" format, which may be customized to accommodate a variety of applications, as discussed in U.S. Provisional application Ser. No. 62/198,580, which is incorporated herein in its entirety.

Figure 5:
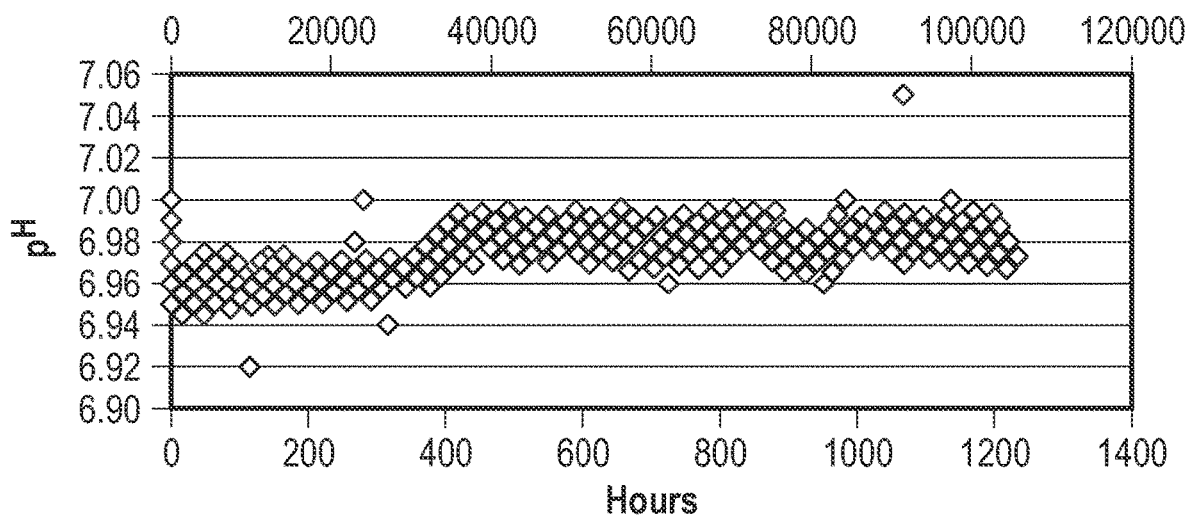
FIG. 5 is a graph demonstrating longevity for a solid state S4 Blade pH sensor exposed to Gamma rays at 36-38 Kgray over 50 days in BDH pH 7 with 100 mM NaCl added and run at 37 deg C., in accordance with a representative embodiment of the present invention.

In some embodiments, pH probe 40 comprises great stability and works well within the accuracy range of ±0.1 pH units. pH probe 40 is further configured to work without failure for more than 21 days. In some instances, pH probe 40 can withstand gamma radiation used for sterilization purposes up to 45 KGy, without failure. Accordingly, pH probe 40 is compatible for use in various Biotech industry applications needing special sterilization techniques. In some embodiments, pH probe 40 does not show any change in performance after sterilization, as shown in FIG. 5.

In one embodiment, computer processor 50 utilizes SWV electronics to multiplex between the inputs from the working electrode (WE) and the internal electrode (IE) of one or more pH sensors. The WE and IE inputs are electrically equivalent and are in common with the reference electrode/pseudo reference electrode (RE/PRE) and counter electrode (CE) circuits. The operation of this system is illustrated in the block diagrams shown in FIG. 5.

Figure 6:
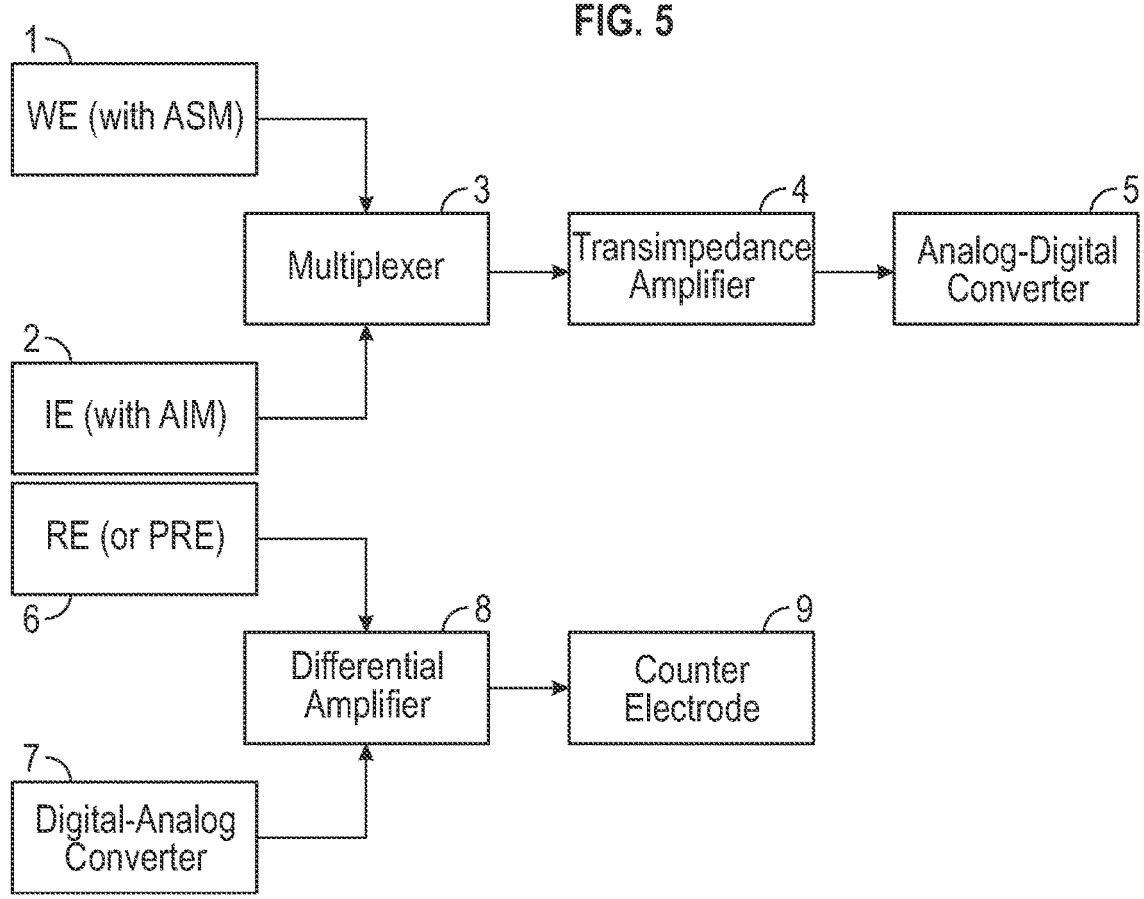
FIG. 6 is a schematic view of an electronics system in accordance with a representative embodiment of the present invention.

With continued reference to FIG. 6, the differentiating feature of the potentiostat circuitry (Blocks 1 to 9) is a multiplexer (3), used to select either the ASM or AIM electrodes. The transimpedance amplifier (4), analog-digital converter (ADC) (5), Reference Electrode (6), digital-analog converter (DAC) for generating the square wave excitation (7), and Difference Amplifier (8) that drives the Counter Electrode (9) are common to both the WE the IE.

The SWV operating parameters, including voltage scan (or sweep) range, pedestal height, equilibration time, and dwell time (i.e. rest time between sequential voltage scans), are independently adjustable for the WE and IE. In one embodiment, the same SWV circuit is used to monitor the WE and IE sequentially.

Figure 7:
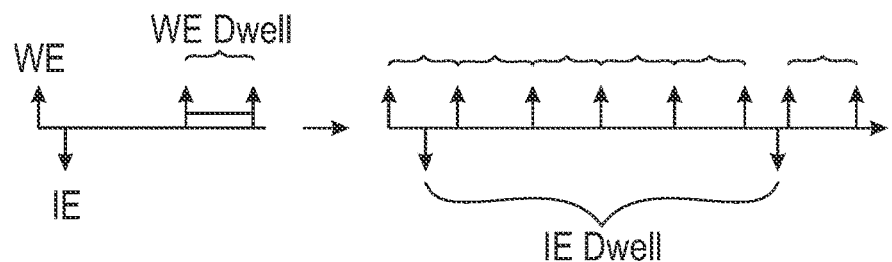
FIG. 7 is a schematic view demonstrating the function of an AIM in a pH probe sensor of a continuous flow system in accordance with a representative embodiment of the present invention.
Figure 8:
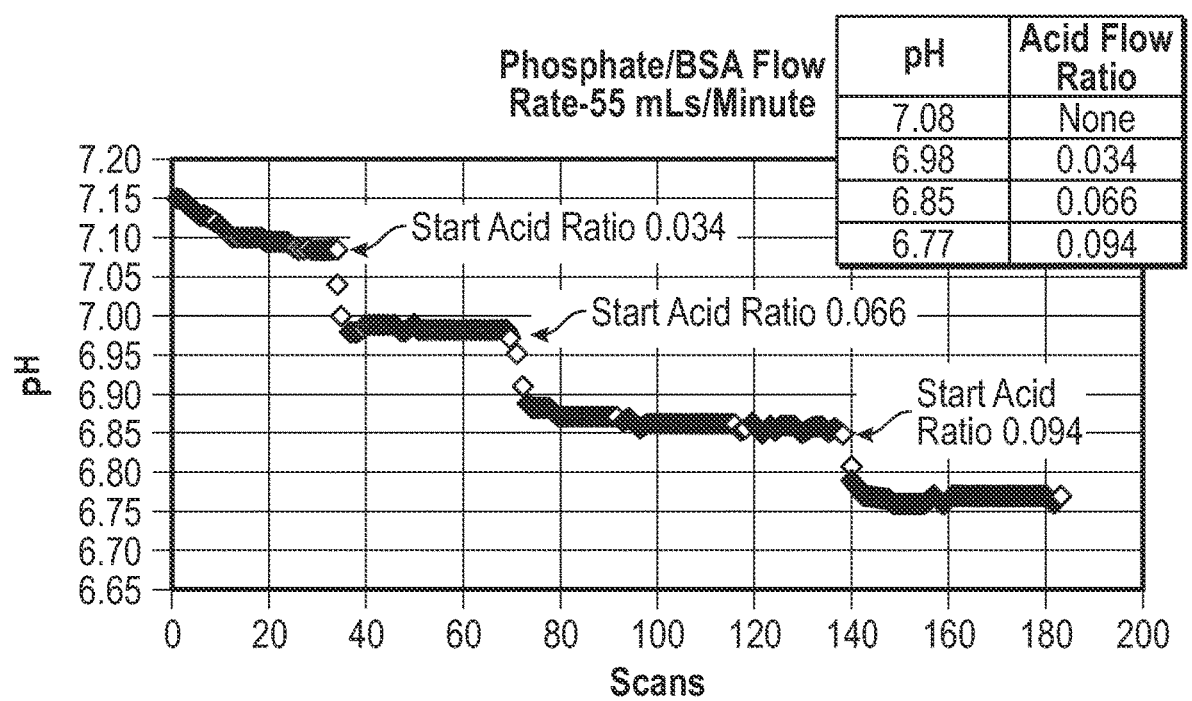
FIGS. 8-13 show various graphs demonstrating pH response of solid state pH sensors in a continuous flow system under various flow conditions in accordance with a representative embodiment of the present invention.

The overall time sequence of WE and IE scan is diagrammed in FIG. 7. Arrows represent grouping of scans, or repetitions, occurring at regular intervals set at independent dwell times.

The scan parameters are optimized for each electrode. Statistics, i.e. peak potential averages and standard deviations of a series of repetitions of scans, can be kept separately for the WE and IE so that the results from these electrodes can be independently analyzed.

EXAMPLES

Example 1: pH Response in Continuous Flow System

Referring now to FIGS. 8-13, various experiments were conducted to test pH response of solid state pH probes under continuous flow conditions. A typical sample used was 100 mM phosphate buffer with 1% W/V BSA. A second solution, 100 mM HCl was used to induce changes in pH. Each solution was introduced at different flow rates into a common ¼ inch ID tube equipped with an in-line static mixer using two separate pumps. This allowed for independent rate adjustments of each solution. Flow rate of the sample (phosphate/BSA) was studied across a range of 5 to 468 mL/min. Flow rate of the HCl was adjusted to create three common Phosphate/HCl ratios for each Phosphate flow rate studied.

Table 1 shows the estimated flow rates of both pumps and the summed flow rate running through the common tube across a range of 5 to 125 mL/min. The final column in table 1 shows how much time is required to fill the chamber from the static mixer based on flow rate.

TABLE 1

Study Design

| Run | Flow Rate (mL/Minute) Phosphate/BSA | Flow Rate (mL/Minute) HCl | Total Flow mL/Minute | Time in Minutes to fill chamber 1 |
|---|---|---|---|---|
| 1-1 | 5 | 0 | 5 | 2.00 |
| 1-2 | 5 | 0.172 | 5.17 | 1.93 |
| 1-3 | 5 | 0.401 | 5.40 | 1.85 |
| 1-4 | 5 | 0.572 | 5.57 | 1.80 |
| 2-1 | 25 | 0 | 25.00 | 0.40 |
| 2-2 | 25 | 0.859 | 25.86 | 0.38 |
| 2-3 | 25 | 1.659 | 26.66 | 0.37 |
| 2-4 | 25 | 2.358 | 27.36 | 0.36 |
| 3-1 | 75 | 0 | 75.00 | 0.13 |
| 3-2 | 75 | 2.403 | 77.40 | 0.129 |
| 3-3 | 75 | 4.92 | 79.92 | 0.125 |
| 3-4 | 75 | 7.051 | 82.05 | 0.121 |
| 4-1 | 125 | 0 | 125 | 0.08 |
| 4-2 | 125 | 4.006 | 129.40 | 0.077 |
| 4-3 | 125 | 8.195 | 133.20 | 0.075 |
| 4-4 | 125 | 11.790 | 136.79 | 0.073 |

Table 2 shows the estimated volumes at certain points along the flow path. Graphs of these results are shown in FIGS. 8-12. Triplicate results for 25 mL/min are shown in FIG. 10.

TABLE 2

Volumes along pathway

| From Static Mixer | Volume in mLs |
|---|---|
| To chamber 1 with the first probe | 6 |
| End of chamber 1 with the first probe | 10 |
| To chamber 2 with the second probe | 12 |
| To end of chamber 2 with the second probe | 36 |

For this example, a continuous flow system 10 according to FIG. 1 was provided, wherein pH probe 40 was subject to flow conditions, and second, downstream pH probe 60 was used to verify pH of the final blend following mixing in static mixer 34. It was found during the course of the study that the pH probe 60 was subject to slow changes in pH after each change in HCl flow. This is likely due to delay in fully replacing the previous sample due to the large box shaped chamber 2. Only chamber 1 data is discussed herein.

Solid state probes demonstrated good response and accuracy in flow applications across a flow rate of 5 to 500 ml per minute without compromising accuracy, as shown in FIGS. 8-13. Sensor to sensor variability was determined to be within ±0.1 pH units per the target accuracy specification. Using factory calibration, four solid state probes measured all flow samples within ±0.05 pH units of a freshly calibrated glass pH meter. The experiment matrix was filled in, according to Table 1 and different flow rates were used to check the accuracy and precision of solid state pH probes. The probes were checked under flow first and then cross-checked for their performance in Static conditions for comparison purposes. The probes maintained their accuracy as mentioned in the above paragraph.

Measurement of pH was responsive and accurate. At each acid rate change the sensor equilibrated within 1-2 minutes. The time to fill pH sensor housing 1 from the static mixer was estimated at 2 minutes at a flow rate of 5 mls/minute, (Table 1 and FIG. 8). The sensor responded immediately to changes in pH of the solution based on flow rate and volume to fill the pH sensor housing or port.

The initial "no acid" condition showed drift of 0.06 pH units in the first 3 minutes of measurements. This is likely related to the pH sensor housing or port filling during the initial part of the run. As the pH sensor housing or port achieved full volume, the sensor measured accurately. This delayed effect was not observed in the remaining runs as the pH sensor housing or port was full after the initial run.

Figure 9:
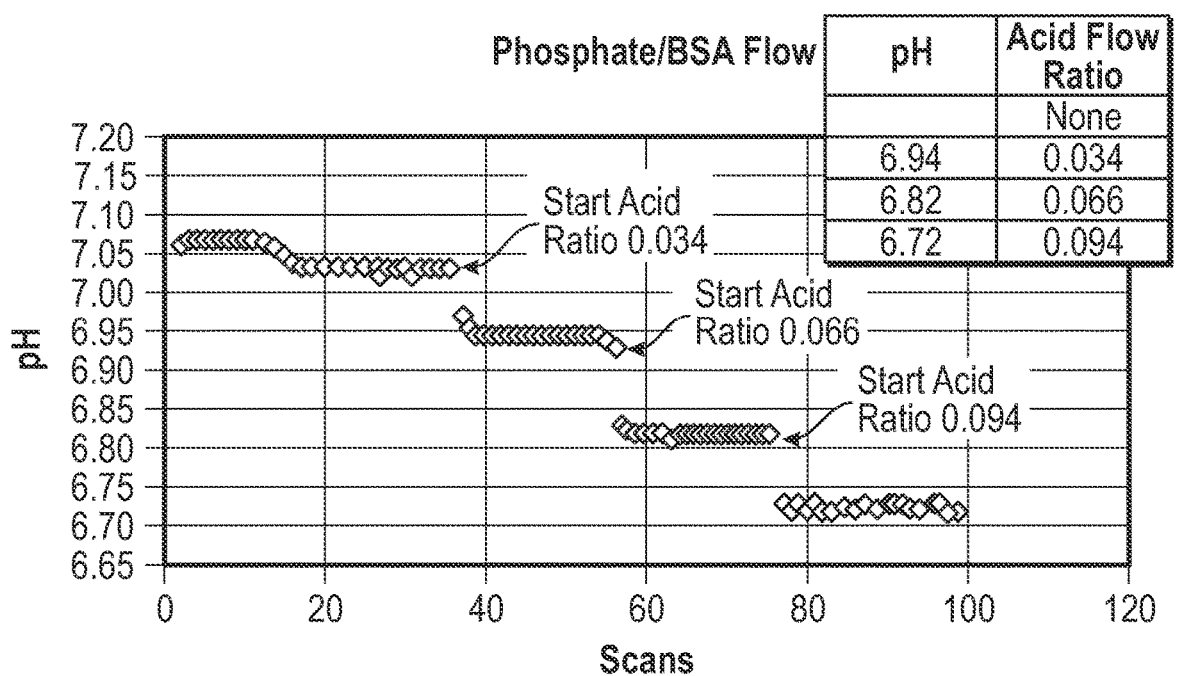
Figure 10:
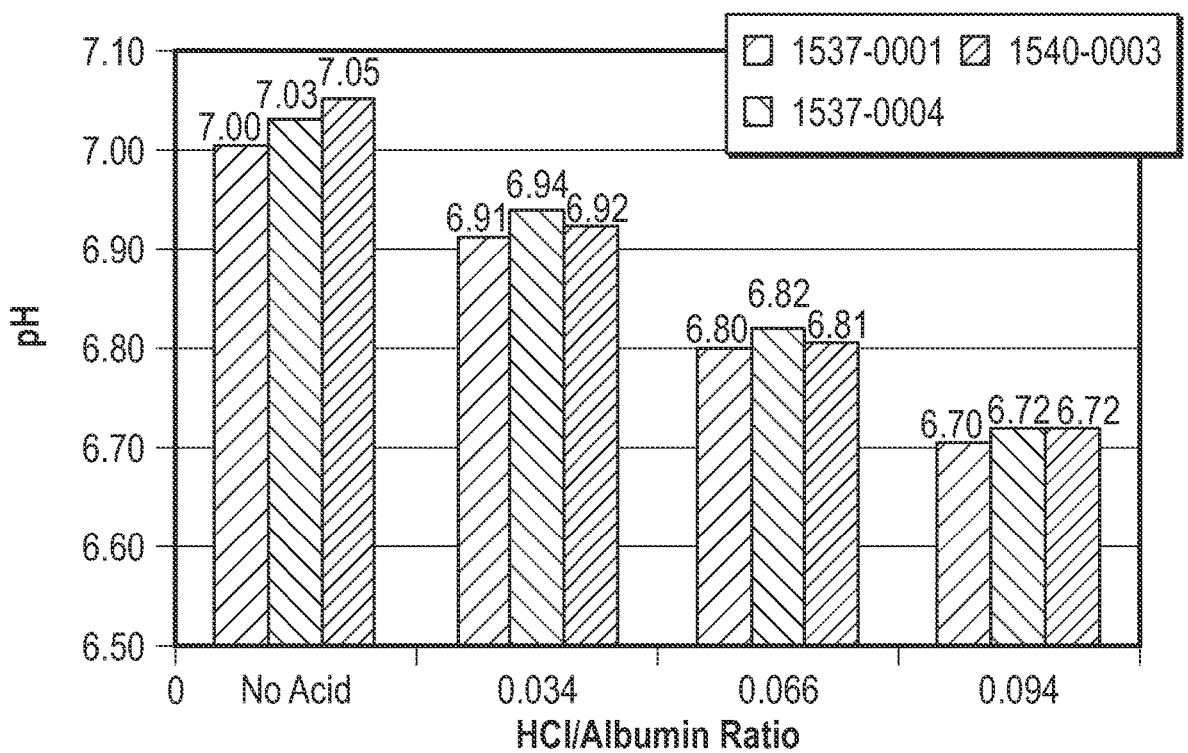

With reference to FIGS. 9 and 10, the data demonstrated quick response and accuracy with 25 mL/Minute flow rate. At each acid rate change the sensor responded within 15-30 seconds. Time to fill pH sensor housing 1 is estimated at 20 seconds, so response time is within 10 seconds. Data demonstrates probes are well within ±0.1 target.

The first acid rate addition was erroneously set low (1 RPM used vs required 3.75 RPM). The pH change was therefore smaller than expected. Midway through the first acid addition data, the acid flow rate was corrected. The erroneous acid flow rate demonstrates that solid state pH sensor technology is responsive to smaller changes in pH then called out in the study.

Figure 11:
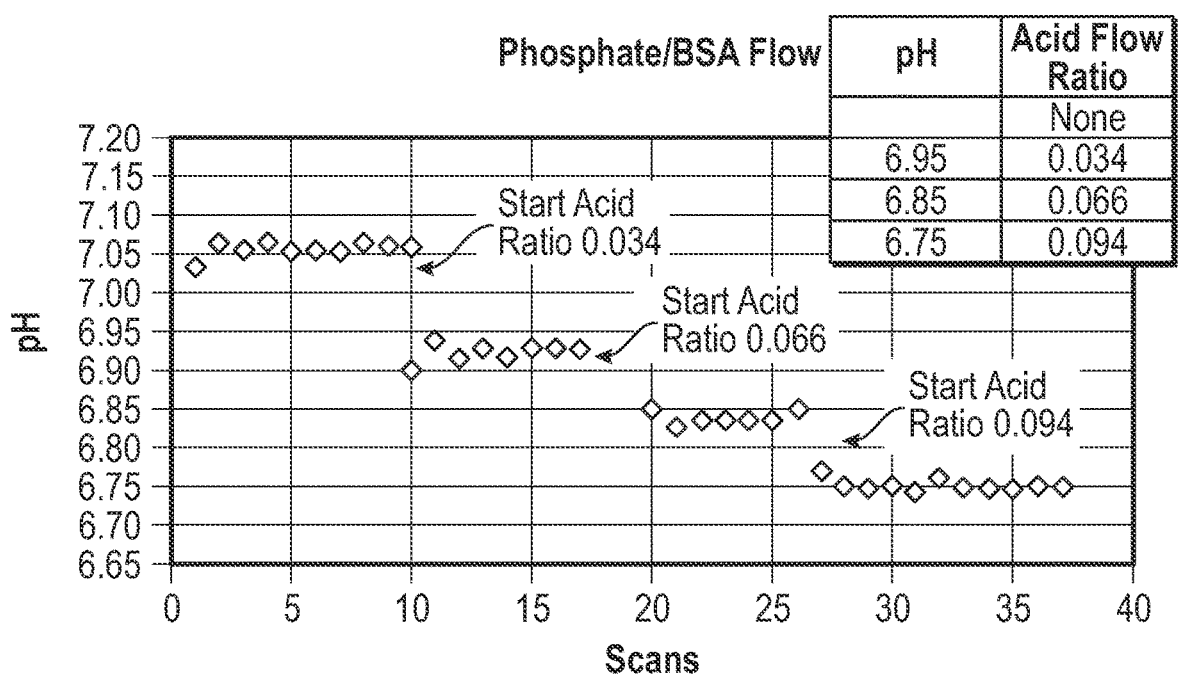

Referring now to FIG. 11, the data demonstrated quick response and accuracy with 75 mL/Minute flow rate. Response is seen immediately at all acid/albumin ratios.

Figure 12:
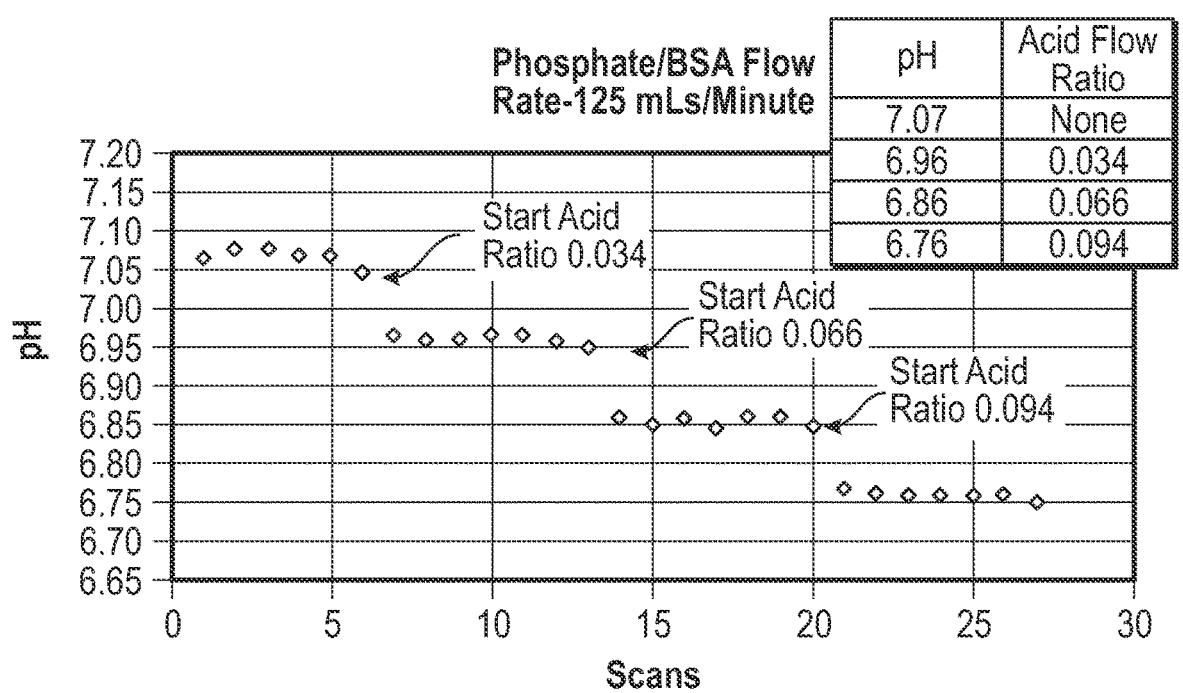

Referring now to FIG. 12, the data demonstrates quick response and accuracy with 125 mL/minute flow rate. The results do appear slightly noisy however very small differences are observed with no trend.

Figure 13:
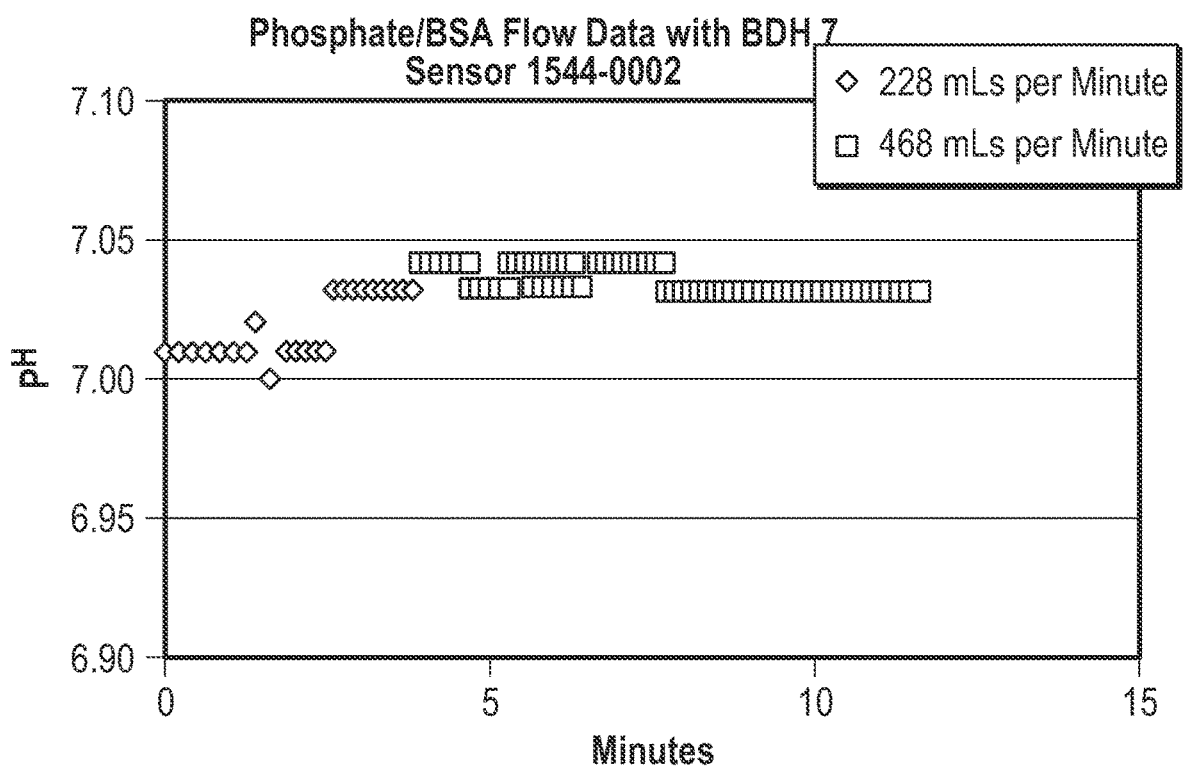
Figure 14:
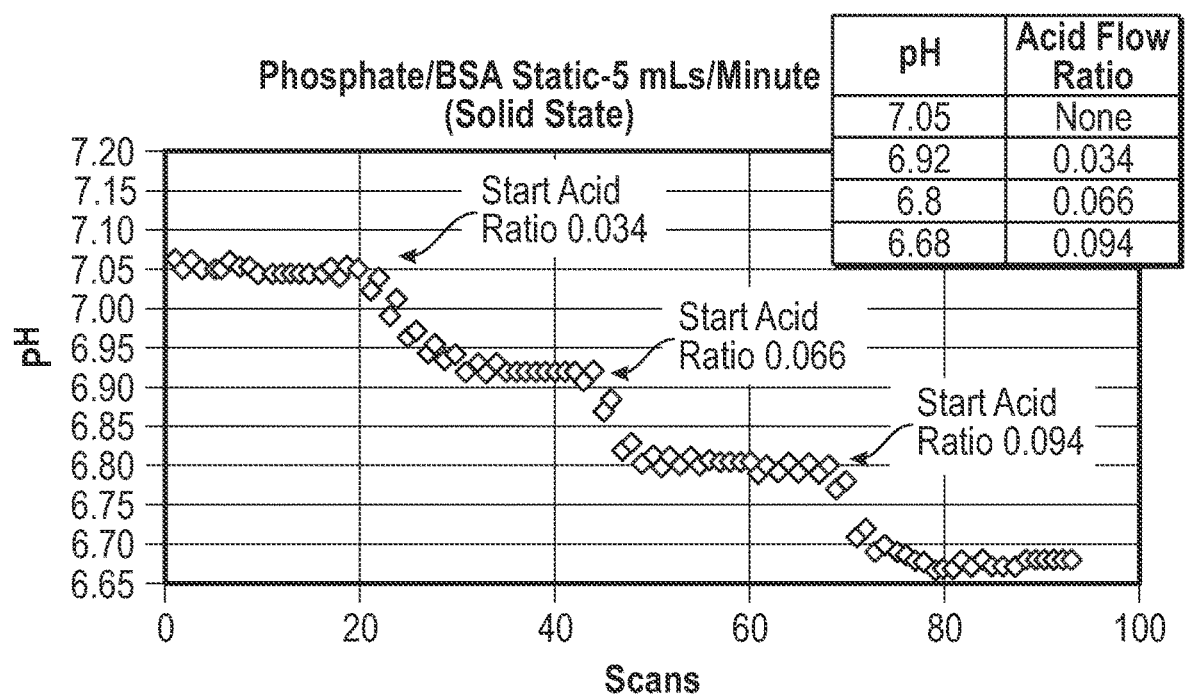
FIGS. 14-19 show various graphs demonstrating pH response of solid state pH sensors under static conditions in accordance with a representative embodiment of the present invention.
Figure 15:
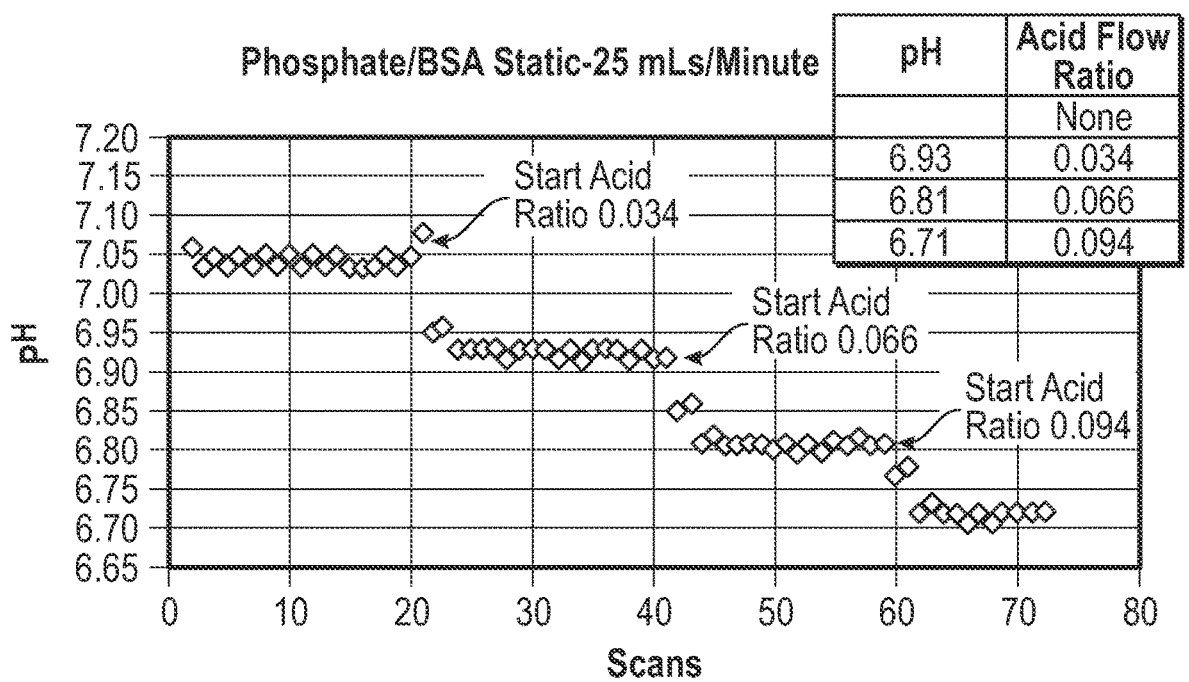
Figure 16:
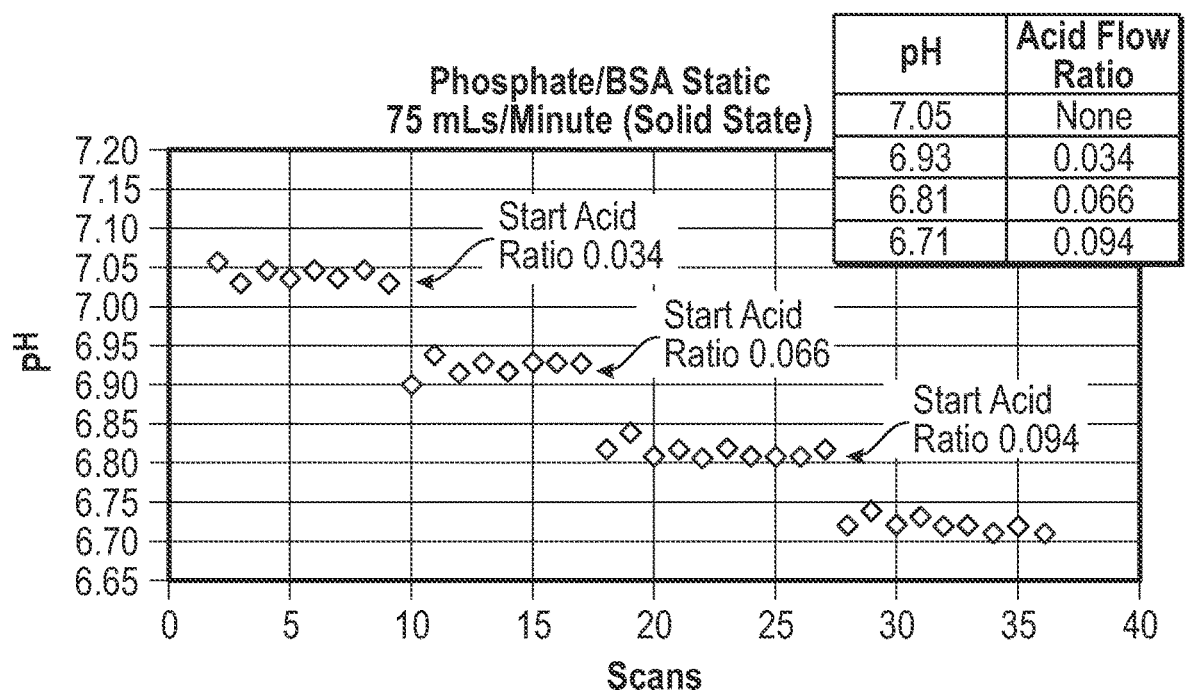
Figure 17:
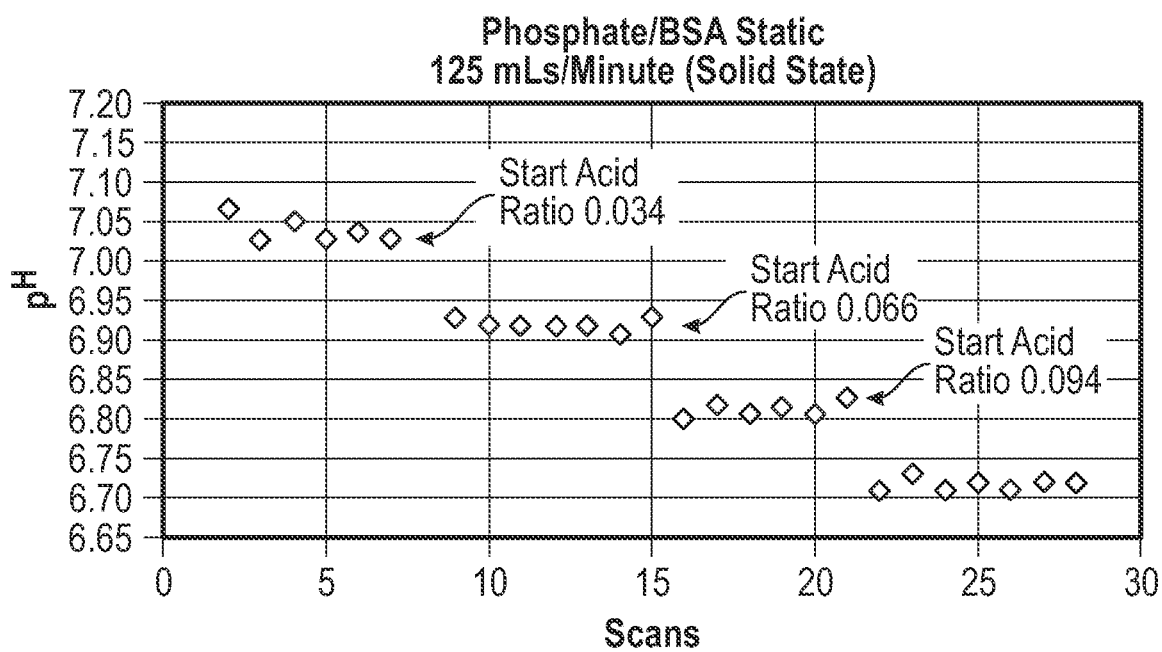
Figure 18:
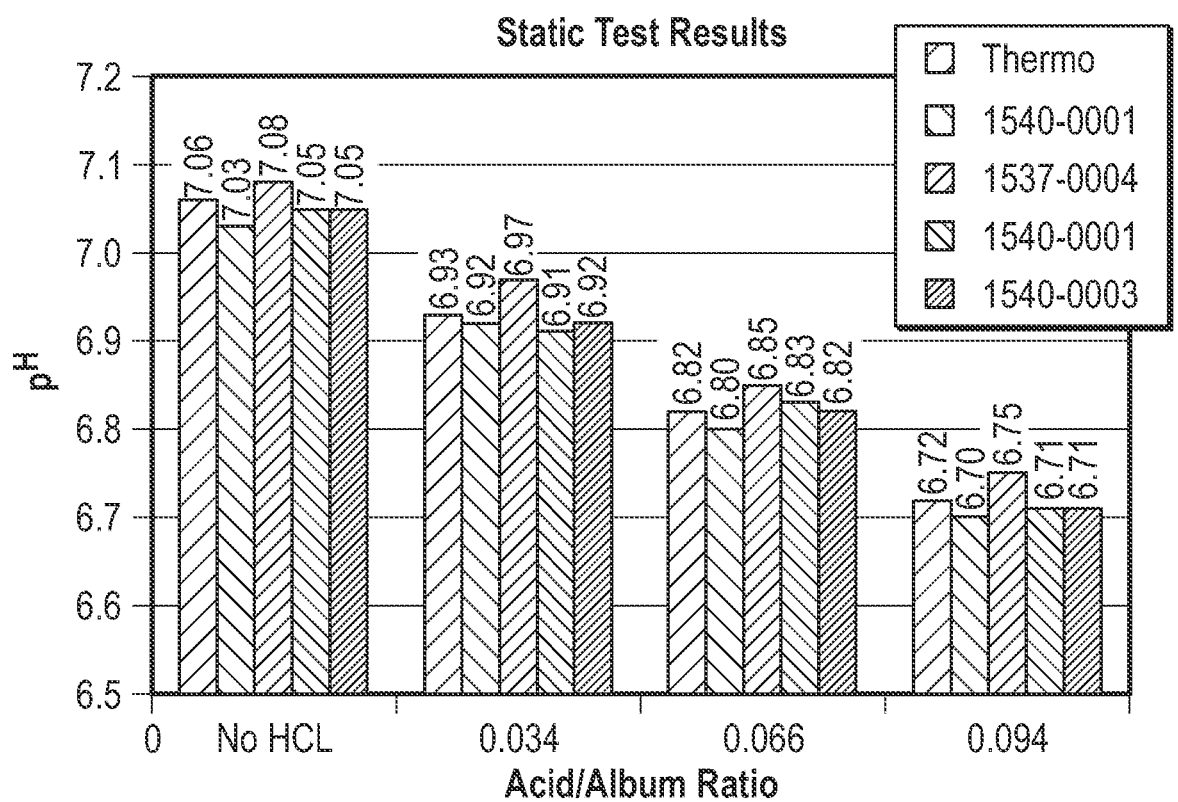

With reference to FIG. 13, the data demonstrates steady pH readings at flow rates of 228 and 468 mL/min.

Example 2: Static pH Measurements of Solid State pH Probes

Referring now to FIGS. 14-19, various experiments were conducted to test pH response of solid state pH probed under static conditions. Static samples were collected at each flow rate from the continuous flow experiments discussed above. Each static sample was tested with solid state and traditional glass bulb pH meters. The static pH measurements were then compared to the continuous flow pH measurements. With reference to FIGS. 14-18, the static pH measurements agree within ±0.05 pH units of the continuous flow pH measurements.

Figure 19:
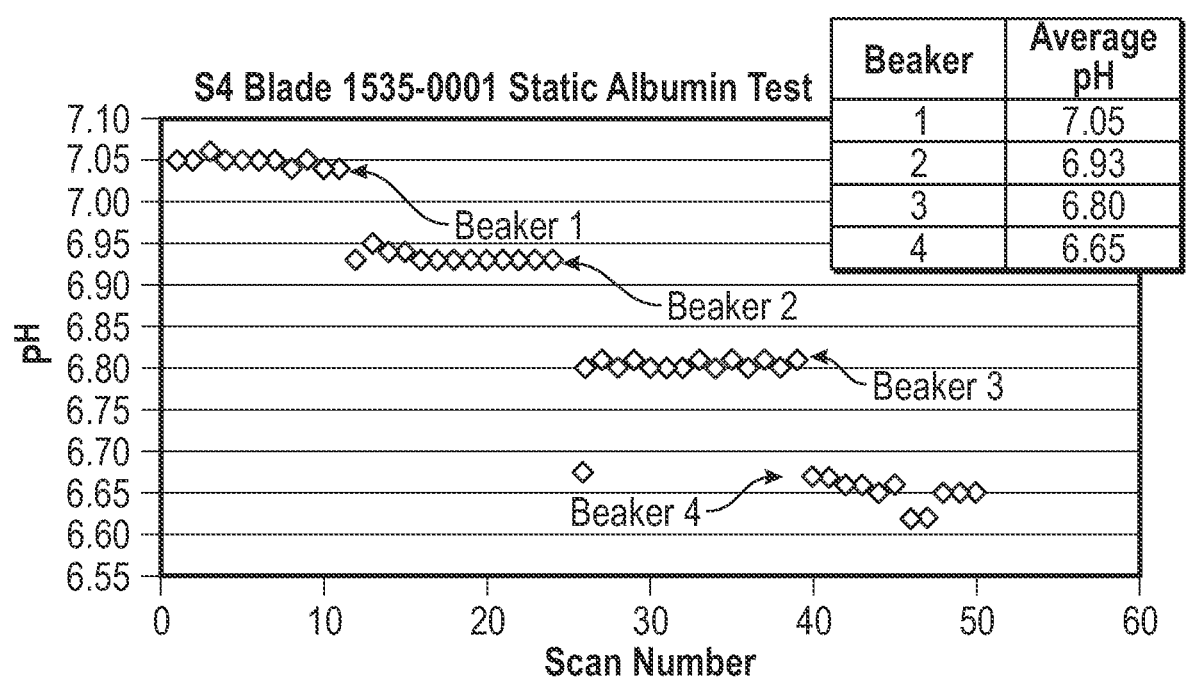

Referring to FIG. 19, static testing of the same continuous flow samples was conducted using a Senova S4 Blade. The probe was run continuously with no rinsing of the probe between samples. The probe was placed into each sample directly, and washed between samples by swirling the probe in fresh water. The results of this test demonstrate the quick response of the solid state pH sensors when placed into each new sample, with accuracy within ±0.1 of the target.

Example 3: Response Time Vs Glass pH Probes-Under Non-Flow Condition (Static Condition)

Referring now to FIG. 20, response time of both solid state and hybrid probes were established empirically based upon titration of hydrochloric acid into a flow process. The hydrochloric acid addition reduces pH and it was found that both probe types response time was limited by scan rate only. The response time for the solid state was less than one minute at the start of a run and 15 seconds thereafter. The hybrid probe showed similar results. Glass probes were tested and found not to give valid pH readings, as no change was observed in pH upon addition of hydrochloric acid. It was determined that glass probes do not accurately measure pH in flow conditions.

Connective slope points either increasing in positive direction or decreasing in negative direction indicates that millivolts are changing in single direction. After achieving the required equilibration, the slope points will approach the zero-slope line which means the stability point is reached. As shown in the above plots solid state pH sensor slope line approaches the zero-slope line very fast and the total variation is less than ±0.15 mV around the zero-slope line. Measurements of pH will change 0.1 units with a shift of 6 millivolts, so the response time is immediate based on accuracy. Millivolts are plotted for Senova probes (left side range axis) with the total range shown being ±0.1 pH units or 12 mV.

Example 4: Food and Beverage Industry

A continuous flow solid state pH monitoring system in accordance with the present invention is used to monitor the pH of various food or beverage ingredients, or final products during a manufacturing process. These products may include water, juices, juice blends, baby foods, fruit and vegetable purees, canned foods, packaged foods, fresh foods, and processed foods. In one instance, a plurality of continuous flow solid state pH monitoring systems is located throughout a manufacturing plant to monitor various components of a final food or beverage product. In one instance, a plurality of continuous flow solid state pH monitoring systems are located at various stages of a manufacturing process to monitor the pH of a food or beverage product at various points of development and/or completion.

Example 5: Life Sciences and Pharmaceutical Industry

A continuous flow solid state pH monitoring system in accordance with the present invention is used to monitor pH of various life science and/or pharmaceutical materials in a laboratory setting, or as part of a manufacturing process. The materials may include water, buffering agents, chemicals, cell cultures, lysates, growth medium, reagents, analyte solutions, vaccines, liquid medicinal preparations, excipients, biologics, eluents, urine, and blood. In one instance, a plurality of continuous flow solid state pH monitoring systems are located throughout a laboratory or manufacturing plant to monitor various components of a final life science or pharmaceutical material or product. In one instance, a plurality of continuous flow solid state pH monitoring systems is located at various stages of a manufacturing process to monitor the pH of a life science or pharmaceutical product at various points of development and completion.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A continuous flow pH sensor housing, comprising:
an outer top surface comprising a threaded opening;
an outer bottom surface opposite the outer top surface;
a sidewall comprising an outer sidewall surface and an inner sidewall surface, said inner sidewall surface in fluid communication with the outer top surface via the threaded opening;
an inner bottom surface, said inner bottom surface and said inner sidewall surface defining a fluid pathway;
an inlet port positioned in the sidewall in proximity to, and spaced apart from, the inner bottom surface and in fluid communication with the fluid pathway;
an outlet port positioned in the sidewall in proximity to the threaded opening and in fluid communication with the fluid pathway, such that a distance between the outlet port and the inner bottom surface is greater than a distance between the inlet port and the inner bottom surface; and
a pH probe adapter threadedly coupled to the threaded opening and comprising a central opening configured to selectively receive a pH sensor such that a distal tip of the pH sensor is positioned between the inner bottom surface and the inlet port.

2. The pH sensor housing of claim 1, wherein the pH sensor comprises a plurality of solid state electrodes.

3. The pH sensor housing of claim 2, wherein the plurality of solid state electrodes are selected from the group consisting of a working electrode, a reference electrode, a pseudo reference electrode, and a counter electrode.

4. The pH sensor housing of claim 1, wherein the pH sensor comprises a probe assembly having an elongated body, a portion of which is inserted through the central opening.

5. The pH sensor housing of claim 2, wherein the inlet port and the outlet port define the fluid pathway through the pH sensor housing.

6. The pH sensor housing of claim 5, wherein the fluid pathway maintains a constant flow of a fluid through the pH sensor housing.

7. The pH sensor housing of claim 5, wherein the pH sensor is positioned within the pH sensor housing such that the plurality of solid state electrodes is positioned in the fluid pathway in proximity to the inlet port.

8. The pH sensor housing of claim 1, wherein the pH sensor further comprises an analyte insensitive material (AIM).

9. A continuous flow pH monitoring system, comprising:
a pH sensor;
a pH sensor housing comprising:
an outer top surface comprising a threaded opening;
an outer bottom surface opposite the outer top surface;
a sidewall comprising an outer sidewall surface and an inner sidewall surface, said inner sidewall surface in fluid communication with the outer top surface via the threaded opening;
an inner bottom surface, said inner bottom surface and said inner sidewall surface defining a fluid pathway;
an inlet port positioned in the sidewall in proximity to, and spaced apart from, the inner bottom surface and in fluid communication with the fluid pathway; and an outlet port positioned in the sidewall in proximity to the threaded opening and in fluid communication with the fluid pathway, such that a distance between the outlet port and the inner bottom surface is greater than a distance between the inlet port and the inner bottom surface; and
a pH probe adapter threadedly coupled to the threaded opening and comprising a central opening configured to selectively receive the pH sensor such that a distal tip of the pH sensor is positioned between the inner bottom surface and the inlet port.

10. The system of claim 9, further comprising an upstream fluid source coupled to the inlet port.

11. The system of claim 10, further comprising a fluid pump interposed between the upstream fluid source and the pH sensor housing.

12. The system of claim 10, further comprising an in-line static mixer interposed between the upstream fluid source and the pH sensor housing.

13. The system of claim 9, wherein the pH sensor comprises a plurality of solid state electrodes.

14. The system of claim 13, wherein the plurality of solid state electrodes are selected from the group consisting of a working electrode, a reference electrode, a pseudo reference electrode, and a counter electrode.

15. The system of claim 9, wherein the pH sensor comprises a probe assembly having an elongated body, a portion of which is inserted through the central opening.

16. The system of claim 9, wherein the fluid pathway maintains a constant flow of a fluid through the pH sensor housing.

17. The system of claim 9, wherein the pH sensor measures pH accurately to within ±0.1 pH units.

18. The system of claim 9, wherein the system supports flow rates from 5 ml/min to 500 ml/min.

19. The system of claim 9, wherein the system provides real-time pH monitoring under flow conditions.

* * * * *